Patented May 6, 1930

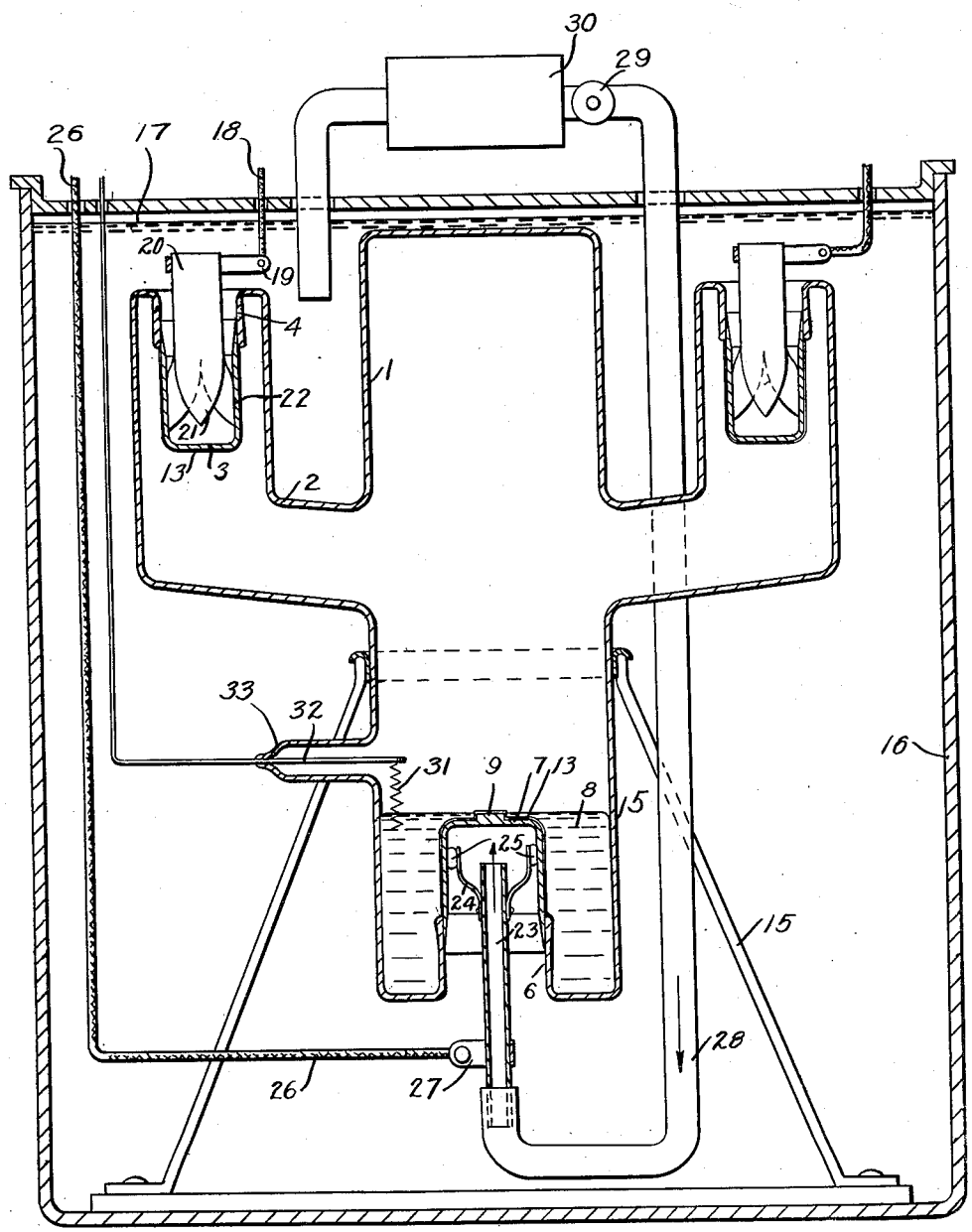

1,757,605

UNITED STATES PATENT OFFICE

DAYTON ULREY, OF WILKINSBURG, PENNSYLVANIA, ASSIGNOR TO WESTINGHOUSE ELECTRIC & MANUFACTURING COMPANY, A CORPORATION OF PENNSYLVANIA

MERCURY ARC RECTIFIER

Application filed September 28, 1923. Serial No. 665,407.

My invention relates to space-current devices and it has particular relation to devices utilizing gases or vapor for carrying the current.

The principal object of my invention is to provide a mercury arc device of an improved character which is adapted to operate without supervision and attendance on heavy currents and high voltages.

A more particular object of my invention is to provide combined glass and metal vessels, the metal portions thereof being of a material which is particularly well adapted for making good, gas-tight seals with glass, and where such material is detrimentally affected by the gas or vapor of the device, to provide means for protecting the metallic portions of the vessel from the gas or vapor.

A still further object of my invention is to provide improved means for supplying current to the electrodes of devices of the above-described character, such means being also utilized for supplying a cooling liquid for cooling the electrodes.

For many years, efforts have been made to adapt the familiar type of glass-vessel mercury rectifiers for the rectification of large currents, since the difficulties encountered in the construction of mercury rectifiers utilizing enclosing metal vessels, in particular, the difficulties in maintaining a sufficiently high vacuum in such vessels, would be obviated by the employment of glass vessels. The chief difficulties encountered in adapting mercury rectifiers of the glass-vessel type for the use on high currents consist in the construction of leads for conveying the currents into the vessel and in not sufficiently cooling the electrodes of the same.

I have found that, by using an improved seal between glass and metal, I may construct mercury rectifiers of the glass-vessel type which have all of the desirable qualities, as to reliability of operation and small degree of required attention, as the usual low-current glass rectifiers, and which are capable of carrying currents up to practically any desired value.

In carrying out my invention, I provide a glass vessel having tubular or cup-shape metal electrodes welded to the vessel and constituting a part of the walls thereof. To this end I utilize seals between glass and copper on account of the ability of copper to produce good gas-tight seals with glass. It has been found that combined glass and metal vessels utilizing copper-glass seals are capable of maintaining a high degree of vacuum for an indefinite time in the same manner as all-glass vessels. There is, however, a serious objection to the utilization of copper electrodes for mercury arc rectifiers, on account of the solubility of copper in mercury, which causes the destruction of such electrodes wherever the copper comes into direct contact with the mercury or mercury vapor. In order to overcome this difficulty and at the same time secure the high-vacuum properties of copper-to-glass seals, I utilize combined electrodes having one portion which consists of copper and is welded to the glass of the vessel and another portion having a surface of a mercury resistant material, such as iron, nickel or cobalt, the latter portion being exposed to the mercury and performing the function of the electrode proper.

Such electrodes may conveniently be made by sealing a copper member of cup or tubular shape to a glass member constituting a part of the glass vessel and plating the exposed metal parts of the combined glass-metal body so obtained with a mercury resistant material such as nickel. The nickel coating then covers the entire exposed portion of the electrode and effectively protects the same against the detrimental action of the mercury.

In order to increase the current-carrying capacity of the electrode, I furthermore provide effective cooling means for cooling the most affected parts of the same. To this end, I utilize the conductors which supply current to the electrodes for supplying an abundant amount of cooling liquid to the points to which the current is supplied and I thereby maintain a good circulation of the cooling liquid at such points.

With the foregoing and other objects in view, my invention consists in the arrangements, details of construction and methods described and claimed hereinafter and illustrated in the accompanying drawing, the single figure thereof being a diagrammatic sectional view of a mercury arc rectifier made according to my invention.

The mercury arc rectifier comprises a substantially cylindrical glass vessel 1 having two side arms 2, each side arm being provided with an anode 3 of cup shape welded to a reentrant tubular end portion 4 of the side arm. The lower portion 5 of the cylindrical glass vessel 1 is provided with a reentrant tubular glass member 6, to which is welded a cathode member 7 of cup shape. A body of mercury 8 fills the lower portion 5 of the glass vessel and surrounds the cathode member 7, leaving exposed only a centrally projecting knob 9 on the cathode member 7 for centering the rectifying spot of the mercury arc in a well-known manner.

The two anodes 3, as well as the cathode 7, are made of copper and are provided, at their open ends, with tapered knife-like end portions for welding to the glass, the tubular glass portion being preferably welded to the outer surface of the knife-like end portion of the copper electrode. It has been found that welds between glass and a knife-like edge of such tubular copper members constitute an absolutely gas-tight connection. In order to protect the copper electrodes 3 and 7 from the action of the mercury, each electrode, for instance the combined electrode 3 with the adjacent glass portion 4 is treated with a plating bath and a heavy coating 13 of a mercury-resistant material, preferably nickel, is plated upon the surface of the electrode which is exposed to the action of the mercury vapor in the glass vessel. The nickel coating then constitutes the active surface of the anode, while the knife-like copper end portion of the tubular member 3 constitutes the portion of the electrode to which the glass is welded.

The rectifier may be mounted upon a stand 15 within an oil-filled container 16, the upper level of the oil being indicated by a line 17. The current is supplied to the anodes 3 by means of conductors 18 and clamps 19 engaging the outer surface of the tubular contact member 20, one end 21 of which is split and expanded for making a resilient conducting connection to the inner walls 22 of the electrodes. The conducting connection to the cathode may be made by means of a somewhat differently constructed contact member comprising a tubular portion 23 inserted into the reentrant cathode member 7. The end portion of the tubular member carries a plurality of resilient fingers 24 having at their end portions contact members 25 making electrical contact with the walls of the cathode member 7. The tubular member 23, as well as the resilient fingers 24, may be made of a conducting material and the current thereto supplied by means of a conductor 26 engaging, by means of a clamp 27, the tubular member 23.

In operation, the cooling liquid would be trapped within the cup-shaped inverted cathode member 7 and, under such circumstances, the temperature might rise to such a high value as to vaporize the oil and produce gas bubbles which would be trapped at the upper portion of the inverted cup-shaped electrode, thus reducing the heat interchange between the oil and the electrode. To prevent the harmful effects which may result from such conditions, I connect the lower portion of the tubular metal member 23, by means of a hose 28, preferably of non-conducting material, a pump 29 and a cooler 30 with an oil supply source, for example, with the oil in the container 16, the pump 29 supplying a stream of cooling oil through the tubular member 23, to the upper portion of the electrode 7 for maintaining a constant circulation of cooling liquid in the proximity of the current-carrying parts of the electrode. I secure thereby a low temperature of the electrodes under all conditions of operation.

The above-described arrangement for cooling of the cathode may be utilized with like effect for cooling and supplying current to the anodes, for any other electrodes operating under similar conditions by connecting in a similar manner the tubular contact members 20 to an oil supply.

The rectifier is also provided with a starting electrode comprising a tungsten filament 31 immersed at its lower end in the mercury 8 and connected at its upper end to a conductor 32 which is welded into a side arm 33 of the glass vessel.

Wherever I state in the appended claims nickel or a plating of nickel I intend it to include not only nickel as such, but any other metal, such as iron or cobalt, for instance, that will form a conducting coating that is not materially affected by mercury and is capable of forming a coherent layer that will protect the underlying material against the injurious action of the mercury.

I do not wish to be restricted to the exact arrangements shown herein, but desire that only such limitations shall be placed upon my invention as are set forth in the appended claims.

I claim as my invention:

1. In a mercury vapor device, a glass wall, an electrode comprising a portion welded to said glass wall, said portion having parts detrimentally affected upon exposure to mercury, and a plating of nickel covering said parts.

2. The method of providing a lead-in conductor for an electric device containing mercury which consists in welding said conductor to a glass member and plating portions of said conductor exposed to mercury vapor with a material which is not affected by mercury.

3. The method of providing a lead-in conductor for a mercury vapor device which consists in welding a copper conductor to a surrounding glass member and plating portions of said copper conductor exposed to mercury vapor with nickel.

4. The method of making an electrode for a gaseous-electric device which consists in welding a tubular copper electrode to a tubular glass member, and coating the exposed surface of said tubular electrode with a metal which does not alloy with mercury.

5. A mercury-electric device comprising a gas-tight vessel having a metal wall portion and a glass wall portion joined to each other by means of a thin-edged gas-tight seal, said metal sealing readily with glass but being detrimentally affected by mercury, and a plating of a metal which does not alloy with mercury on the wall parts exposed to mercury vapor.

6. A mercury electric device comprising a gas-tight vessel having a glass portion and a copper portion welded to each other and a plating of nickel covering parts of said copper portion exposed to mercury.

7. A mercury-electric device comprising a glass container adapted to contain mercury vapor and having an opening therein the edges of which are re-entrant, a cup-shape copper element welded to the outer surface of said container coextensive with said edge to provide a re-entrant electrode, and a plating of nickel on the surfaces of said electrode exposed to mercury vapor during the operation of said device.

In testimony whereof I have hereunto subscribed my name this 25th day of September, 1923.

DAYTON ULREY.